United States Patent [19]

Silvey

[11] 4,103,910
[45] Aug. 1, 1978

[54] PISTON-CYLINDER SEAL ASSEMBLY

[76] Inventor: Elmer R. Silvey, 1231 Dutton Rd., Eagle Point, Oreg. 97524

[21] Appl. No.: 793,839

[22] Filed: May 5, 1977

Related U.S. Application Data

[62] Division of Ser. No. 621,757, Oct. 14, 1975, Pat. No. 4,026,524.

[51] Int. Cl.² .................. F16J 15/18; A01G 23/08
[52] U.S. Cl. ............................ 277/165; 277/188 R; 254/93 R; 144/34 R
[58] Field of Search .............. 277/34, 188 R, 188 A, 277/189, 165, 176, 177, 186, 83, 85, 88, 89, 91, 92; 254/93 R, 133 R, 134; 92/182, 247; 144/34 R, 34 A, 2 N, 309 AC

[56] References Cited

U.S. PATENT DOCUMENTS

| | | | |
|---|---|---|---|
| 2,877,071 | 3/1959 | Arnot | 277/165 |
| 3,011,803 | 12/1961 | Buckner et al. | 277/188 R X |
| 3,172,670 | 3/1965 | Pras | 277/188 R X |
| 3,261,613 | 7/1966 | Norick et al. | 277/188 A X |
| 3,300,225 | 1/1967 | Shepler | 277/165 |
| 3,351,350 | 11/1967 | Shepler | 277/188 R X |
| 3,469,853 | 9/1969 | Gullick | 277/188 R X |
| 3,636,824 | 1/1972 | Clark | 277/165 X |
| 3,860,250 | 1/1975 | Lundquist | 277/165 |
| 3,885,801 | 5/1975 | Scannell | 277/188 R X |
| 3,945,610 | 3/1976 | Solie et al. | 254/93 R |

FOREIGN PATENT DOCUMENTS

| | | | |
|---|---|---|---|
| 952,930 | 8/1974 | Canada | 277/165 |
| 756,460 | 9/1956 | United Kingdom | 277/165 |
| 759,233 | 10/1956 | United Kingdom | 277/188 A |

Primary Examiner—Robert S. Ward, Jr.
Attorney, Agent, or Firm—Eugene M. Eckelman

[57] ABSTRACT

A groove is provided in either one or the other of a cylinder housing or the piston and a pressure sealing ring is mounted in this groove. A resilient ring is in surface engagement with the sealing ring and a semi-resilient ring, also in the groove, is disposed in engagement with the outer edge of the resilient ring whereby upon the application of surface pressure by the sealing ring against the resilient ring as a result of fluid pressure in the cylinder, the resilient ring is compressed. This expands it to a larger diameter which in turn expands the semi-resilient ring to a larger diameter for efficient sealing. A lip on the member with the groove therein projects outwardly for backing up the semi-resilient ring.

3 Claims, 6 Drawing Figures

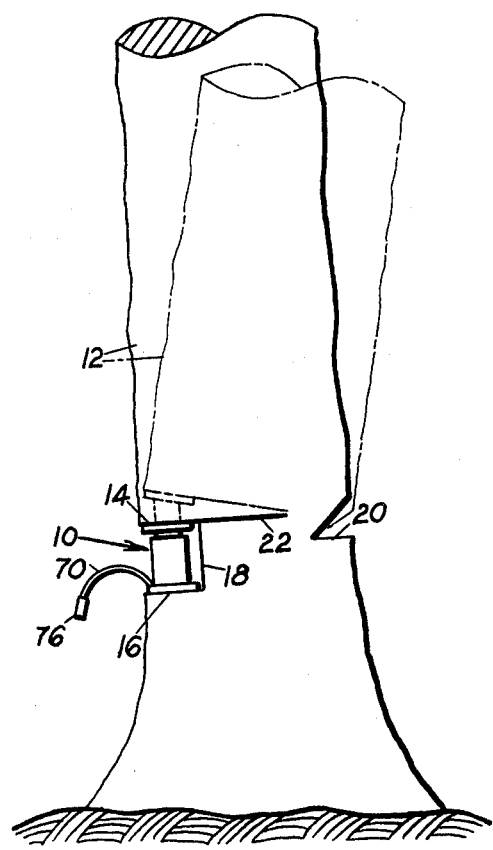

PISTON-CYLINDER SEAL ASSEMBLY

REFERENCE TO PRIOR APPLICATIONS

This application is a division of application Ser. No. 621,757 filed Oct. 14, 1975 for Fluid Operated Ram For Felling Trees, now U.S. Pat. No. 4,026,524.

BACKGROUND OF THE INVENTION

This invention relates to new and useful improvements in rams of the type that assist in felling trees by insertion in a backcut portion provided in the trees.

Fluid operated rams have heretofore been provided for felling trees by inserting the rams in a backcut of the tree and applying an expanding pressure to force the tree in a desired direction as determined by an undercut placed in the tree. By means of such rams, trees can be felled in a precise direction even though they may lean away from the direction in which felling is desired. Such rams allow the tree faller to place the tree down in position for easiest handling and for least breakage. The rams heretofore provided have been large, heavy, bulky and awkward to handle. Such makes them inconvenient not only for use at the felling site but also makes them inconvenient to transport to the site, particularly where they have to be manually packed a portion of the distance.

In the use of the rams in the backcut of a tree, they are subjected to severe side stresses as the tree is straightened up and as it falls. Prior devices have utilized rams with head portions connected thereto by a ball and socket joint and other universal type connections. Such universal connecting arrangements, while providing for pivotal operation of the head in any direction, nevertheless do not allow for relative side movement between the tree and the ram whereby damaging side stresses are imparted to the ram.

SUMMARY OF THE INVENTION

According to the present invention and forming a primary objective thereof, a fluid operated tree felling ram is provided that is light in weight and has a head portion arranged for slidable as well as pivotal movement so as to be free of any side stresses from the tree, and furthermore to provide a fluid operated ram assembly that is readily operated by a hand pump.

Another object is to provide a fluid operated ram assembly including a backpack frame therefor which includes a mounting base for an operating pump for the ram and also including hollow frame portions that provide a reservoir for the pump.

Still another object is to provide a novel seal assembly between the piston and cylinder of the ram.

The above objectives are accomplished by a piston cylinder assembly which employs a hollow piston to substantially reduce the over-all weight. The piston projects from one end of the cylinder and has a convex end surface engageable by a concave portion of an enlarged head. This head is held on the end of the piston for slidable and rotatable adjustment by resilient cord means connected to the base. Novel seal means are provided between the piston and cylinder capable of sealing extremely high pressures between these two members. A hand pump is employed to operate the ram, and also forming a part of the invention is a backpack on which the hand pump is secured. The backpack is made up of hollow frame members which provide a reservoir for the pump, and such backpack also includes brackets for removably holding one or more of the rams, thereby forming an entire tree felling ram assembly that can be manually carried to the site by a single person.

The invention will be better understood and additional objects and advantages will become apparent from the following description taken in connection with the accompanying drawings which illustrate a preferred form of the device.

BRIEF DESCRIPTION OF THE DRAWINGS

FIG. 1 is an elevational view of the present ram as applied in the backcut of a tree and showing in broken lines the operation of the ram to force the tree over;

FIG. 2 is an enlarged vertical sectional view taken through a fluid operated ram which forms a part of the present invention;

FIG. 3 is an enlarged detail view of a pressure seal assembly utilized between the piston and cylinder housing;

FIG. 4 is a rear elevational view of a backpack assembly for transporting one or more of the rams and an operating pump therefor;

FIG. 5 is an enlarged fragmentary sectional view taken on the line 5—5 of FIG. 4; and FIG. 6 is a side elevational view of the backpack assembly.

DETAILED DESCRIPTION OF A PREFERRED EMBODIMENT

With reference first to FIG. 1, the fluid operated ram of the present invention is designated generally by the numeral 10, and the function of a ram of this type is to assist in felling a tree 12 by engagement between top and bottom portions 14 and 16, respectively, of a backcut 18 provided in the tree. In the felling operation, the tree is also provided with an undercut 20 the bottom of which is disposed a short distance below the top portion 14 of the backcut. The saw cut 22 for severing the tree from the stump leads horizontally from the top portion 14 of the backcut toward the front. FIG. 1 shows in broken lines the operation of the ram 10. That is, in a normal position of the tree, it is leaning back relative to the direction in which it is desired to fell it but by operation of the ram, as shown in broken lines, the tree can be felled forward.

With particular reference to FIG. 2, the ram 10 comprises a cylinder housing 24 open at the top and closed at the bottom by an integral base 26. The base is somewhat larger than the cylinder housing and may be of any suitable shape in plan such as square. It has chamfered upper surfaces 28 to reduce the weight thereof as much as possible and has a flat bottom surface 26a.

Slidable in the cylinder housing 24 is a hollow or tubular piston 30 open at the bottom and closed at its top end by a substantially thick end wall 32. The end surface 34 of the wall 32 assumes a convex curvature. The piston being hollow minimizes the over-all weight of the ram.

Associated with the upper end of the piston 30 is a head 36 in the form of a plate having substantially the same outer dimensions and shape in plan as the base 26. The head 36 has a flat upper surface 36a, and its bottom surface 38 is concaved or cupped in an arc of the same degree of curvature as the convex surface 34 of the piston. The outer defining edge 38a of the convex surface 38 is round and the diameter thereof is slightly greater than the diameter of the piston head 32 whereby the head can slide to one side a small amount and still have full bearing support against the convex surface 34. Head 36 has chamfered lower surfaces 40 for reducing its weight.

Head 36 is held on the upper end of piston 30 by a resilient cord 42 engageable with opposed hooks 44 secured to the head 36 and base 26. In a preferred arrangement, the hooks on the head 36 are staggered around the ram relative to the hooks on the base so that as best seen in FIG. 6 the cord can be wrapped in a sinous pattern around the ram. Such hooking arrangement of the cord, although allowing the necessary slidable and rotating adjustment of the head on the piston, holds said head in a rest position in vertical edge alignment with the edges of the base 26.

The slidable guided engagement between the piston 30 and the cylinder 24 is accomplished by upper and lower wear rings 48. These rings are constructed of a durable type material such as Nylon. The upper wear ring 48 is disposed in a peripheral groove 50 in the cylinder, and this wear ring is associated with a dust seal 52 disposed in a groove 53 also in the cylinder.

With particular reference to FIG. 3, the bottom wear ring 48 is also disposed in a peripheral groove 50 but is associated with a pressure seal assembly 54 now to be described. The outer diameter of the piston 30 is substantially less than the inner diameter of the cylinder, leaving a clearance space 55 therebetween. Wear rings 48 extend through the space 55 to provide stable slidable movement of the piston without metal to metal contact with the cylinder. The pressure seal assembly 54 comprises a poly pack or other suitable conventional pressure seal 56 disposed in the lower portion of a groove 58. Disposed in the same groove 58 and seated on the seal 56 in surface engagement therewith is a quad-ring 60 and a ring 62. The ring 60 lies inside the ring 62 with its outer edge in engagement with the inner edge of ring 62. Ring 62 has an outer diameter such that its outer edge is disposed close to the cylinder wall. Ring 62 is constructed of a semi-resilient material such as 101 Nylon and quad-ring 60 is constructed of a resilient material such as neoprene or rubber. The arrangement is such that the seal 56 provides a seal between the piston and cylinder and as the fluid pressure bears against said seal, it pushes up against the resilient quad-ring 60 to distort it radially and expand the ring 62 to a larger diameter so that the outer edge of the latter will remain close to the cylinder surface as the cylinder expands from the fluid pressure. The radial expansion of the ring 62 prevents the seal 56 from creeping up into space 55 and failing. Such arrangement provides a good sealing engagement and at the same time the higher the pressure that is exerted against the seal assembly the greater will be the distortion of the quad-ring 60 and consequently the greater expansion of the ring 62 with the cylinder.

The outer surface of the piston 30 just above and defining a portion of the groove 58 at the seal assembly 54 is provided with an outwardly projecting lip 64 therearound. The outer edge of the lip is smaller in diameter than the diameter of the cylinder but at the same time fills in a substantial portion of the clearance space 55 to provide even less space for allowing failure of the seal. By means of the present pressure seal a positive seal is provided and one that will take high pressures without failing.

With reference to FIG. 2, a fluid inlet passageway 66 leads inwardly from a side of the base and exits from the base so as to communicate with the inner portion of the piston 30. A fitting 68 is secured in the base 26 at the outer end of the passageway 66 and is connected to one end of a hose 70. Pressure operation of the piston in the cylinder is accomplished by any suitable pump means, and such pump may comprise a hand operated pump 72, FIGS. 4 and 6, having an outlet hose 74 adapted for connection to the hose 70. In a preferred arrangement and as seen in FIGS. 1 and 6, hoses 70 and 74 have interconnecting fittings 76 which are arranged to be removably connected with each other. The hose 74 may be of sufficient length to space the pump 72 the desired distance from a tree or if desired an intermediate length of hose, not shown, may be provided to connect between the hose segments 70 and 74. The pump 72 has a control valve 78 thereon for controlling pressure flow to conduit 74.

In a preferred arrangement, pump 72 is secured integrally to a backpack frame 80 having an upper rigid cross member 82 to which the pump is suitably secured. Backpack frame 80 has the usual shoulder straps 84, and the frame members 86 thereof are tubular and have interior communication with each other to provide a reservoir for the pump fluid. As best seen in FIG. 5, a hose fitting 88 is secured in one of these frame members and has connection to a hose 90 leading to the pump 72. In the operation of the pump for driving the piston, the backpack frame 80 may be laid flat on the ground to provide a support for hand operation of the pump, the cross member 82 being sufficiently rigid to provide good support.

With reference to FIGS. 4 and 6, the backpack frame 80 may also be used to carry one or more of the rams 10, and for this purpose, it has a pair of laterally extending facing brackets 92 open at the sides and forming slots into which projecting edges of the base 26 of the ram may be received. Latch members 94 are secured to the sides of the frame 80 and are pivotal between a rearwardly projecting position to confine the rams in their mounted position and a vertically projecting position to be out of the way for removing the rams.

According to the present invention, a fluid operated ram to assist in felling trees is provided that is rugged in construction and at the same time is light in weight and readily handled by a single person in its operation and in its transportation to the site. The particular construction and mounting of the head 36 on the piston allows such head to adjust to the tree movements in felling and eliminates all possibilities of any stresses or damaging forces being imparted to the ram. Since the construction of the head eliminates side stresses, the ram can be constructed to have minimum weight and thus be easier to handle and pack. Furthermore, the lightweight construction of the ram allows it to be readily transported on the back of a person such as by the backpack 80, and the lightweight construction thereof also facilitates the combining of a complete ram felling assembly for carrying including one or more rams, a pump, and the necessary hose.

It is to be understood that the form of my invention herein shown and described is to be taken as a preferred example of the same and that various changes in the shape, size and arrangement of parts may be resorted to without departing from the spirit of my invention, or the scope of the subjoined claims. For example, although the head 36 is shown in engaging association with the piston, it is to be understood that the parts may be reversed wherein the slidable head could be in engagement with the cylinder 24.

Having thus described my invention, I claim:

1. A piston-cylinder seal assembly comprising
   (a) a cylinder housing having an inner surface,
   (b) a piston in said cylinder having an outer surface,
   (c) a groove in one of said inner surface of the cylinder housing and the outer surface of the piston,
   (d) said groove having an inner wall surface and opposed end wall surfaces,
   (e) a resilient pressure sealing ring in said groove,
   (f) said sealing ring having opposite surface portions one of which has engagement with one of said end wall surfaces of said groove,
   (g) a resilient ring in said groove having inner and outer edges and having surface engagement between the other surface of said sealing ring and the other of said end wall surfaces of the groove,
   (h) and a semi-resilient ring in said groove having inner and outer edges and also being in surface engagement between the said other surface of said sealing ring and the other of said end wall surfaces,
   (i) the inner edge of said semi-resilient ring having edge engagement with the outer edge of said resilient ring and the outer edge of said semi-resilient ring having edge engagement with one of said housing and piston, whereby upon the application of surface pressure by the sealing ring against said resilient ring as a result of fluid pressure in the cylinder, said resilient ring is compressed and expands to a larger diameter which in turn expands said semi-resilient ring to a larger diameter as pressure expands said cylinder, thus preventing failure of said pressure seal.

2. The piston-cylinder seal assembly of claim 1 wherein a sliding clearance is provided between said cylinder housing and said piston, a lip on one of said piston and cylinder housing projecting outwardly from the surface of said one of said piston and cylinder housing adjacent to said semi-resilient ring for backing up said latter ring in said sliding clearance.

3. A piston-cylinder seal assembly comprising
   (a) a cylinder housing having an inner surface,
   (b) a piston in said cylinder having an outer surface which has a sliding clearance with the inner surface of said cylinder housing,
   (c) a groove in one of said inner surface of the cylinder housing and the outer surface of the piston,
   (d) a pressure sealing ring in said groove,
   (e) a resilient ring in said groove having an outer edge and being in surface engagement with said sealing ring,
   (f) a semi-resilient ring in said groove disposed in engagement with the outer edge of said resilient ring whereby upon the application of surface pressure by the sealing ring against said resilient ring as a result of fluid pressure in the cylinder said resilient ring is compressed and expands to a larger diameter which in turn expands said semi-resilient ring to a larger diameter as pressure expands said cylinder,
   (g) and a lip on one of said piston and cylinder housing projecting outwardly from the surface of said one of said piston and cylinder housing adjacent to said semi-resilient ring for backing up said latter ring in said sliding clearance.

* * * * *